(12) United States Patent
Kamon et al.

(10) Patent No.: US 12,283,704 B2
(45) Date of Patent: Apr. 22, 2025

(54) SECONDARY BATTERY UNIT AND HUMANOID ROBOT

(71) Applicant: KAWASAKI JUKOGYO KABUSHIKI KAISHA, Kobe (JP)

(72) Inventors: Masayuki Kamon, Kobe (JP); So Yukizaki, Kobe (JP); Junichi Karasuyama, Kobe (JP); Yuki Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 473 days.

(21) Appl. No.: 17/638,209

(22) PCT Filed: Sep. 2, 2020

(86) PCT No.: PCT/JP2020/033231
§ 371 (c)(1),
(2) Date: Feb. 25, 2022

(87) PCT Pub. No.: WO2021/045086
PCT Pub. Date: Mar. 11, 2021

(65) Prior Publication Data
US 2022/0294062 A1    Sep. 15, 2022

(30) Foreign Application Priority Data

Sep. 2, 2019 (JP) ................. 2019-159762

(51) Int. Cl.
*H01M 50/244*    (2021.01)
*B25J 19/00*    (2006.01)
*H01M 50/258*    (2021.01)

(52) U.S. Cl.
CPC ........ *H01M 50/244* (2021.01); *B25J 19/007* (2013.01); *H01M 50/258* (2021.01)

(58) Field of Classification Search
CPC ............. H01M 50/244; H01M 50/258; H01M 50/264; B25J 19/007; B25J 19/005; Y02E 60/10
See application file for complete search history.

(56) References Cited

U.S. PATENT DOCUMENTS

| | | | |
|---|---|---|---|
| 11,641,120 B2* | 5/2023 | Okuoka | H01M 50/262 429/163 |
| 2006/0265104 A1* | 11/2006 | Saito | H01M 50/213 700/245 |

(Continued)

FOREIGN PATENT DOCUMENTS

| | | |
|---|---|---|
| EP | 1110853 A2 | 6/2001 |
| JP | 2002-120187 A | 4/2002 |
| WO | 02/30631 A2 | 4/2002 |

*Primary Examiner* — Abdullah A Riyami
*Assistant Examiner* — Nader J Alhawamdeh
(74) *Attorney, Agent, or Firm* — METROLEX IP LAW GROUP, PLLC; Robert L. Scott, Esq.

(57) ABSTRACT

A secondary battery unit includes a first secondary battery module disposed at at least either one of a front part or a back part of a body of a humanoid robot, a second secondary battery module disposed around the body in a direction intersecting with a front-and-rear direction of the body, and a base coupling the first secondary battery module to the second secondary battery module. The base is detachably attached to the body, together with the first secondary battery module and the second secondary battery module.

19 Claims, 7 Drawing Sheets

(56) References Cited

U.S. PATENT DOCUMENTS

| | | | |
|---|---|---|---|
| 2022/0294062 A1* | 9/2022 | Kamon | ............... H01M 50/244 |
| 2022/0294065 A1* | 9/2022 | Kamon | .................. B25J 9/0009 |

* cited by examiner

SECONDARY BATTERY UNIT AND HUMANOID ROBOT

CROSS-REFERENCE TO RELATED APPLICATION

This application claims the priority of Japanese Patent Application No. 2019-159762 filed in the Japan Patent Office on Sep. 2, 2019, which is hereby incorporated by reference in its entirety.

TECHNICAL FIELD

The present disclosure relates to a secondary battery unit and a humanoid robot.

BACKGROUND ART

Conventionally, bipedal humanoid robots which carries a secondary battery as a power supply are known. For example, Patent Document 1 discloses a bipedal robot which carries a secondary battery on the back of an upper body. According to Patent Document 1, the secondary battery is comprised of, for downsizing of the external shape of the secondary battery, a small-capacity secondary battery module at the center, and large-capacity secondary battery modules on both sides of the small-capacity secondary battery module.

REFERENCE DOCUMENT OF CONVENTIONAL ART

Patent Document

[Patent Document 1] JP2002-120187A

DESCRIPTION OF THE DISCLOSURE

When the secondary battery for supplying the power to the robot is disposed on the back of the robot like the bipedal robot disclosed in Patent Document 1, the heavy secondary battery projects greatly from the rear. For this reason, the center-of-gravity position of the robot carrying the secondary battery is offset greatly rearward from the center axis of the robot in an up-and-down direction. Therefore, a balance control in the posture of the robot becomes complicated and difficult.

Thus, one purpose of the present disclosure is to provide a secondary battery unit and a humanoid robot, capable of reducing an offset of the center-of-gravity position of the humanoid robot.

In order to achieve the purpose, a secondary battery unit according to one aspect of the present disclosure includes a first secondary battery module disposed at at least either one of a front part or a back part of a body of a humanoid robot, a second secondary battery module disposed around the body in a direction intersecting with a front-and-rear direction of the body, and a base coupling the first secondary battery module to the second secondary battery module. The base is detachably attached to the body, together with the first secondary battery module and the second secondary battery module.

A humanoid robot according to another aspect of the present disclosure includes the secondary battery unit according to the one aspect of the present disclosure, and the body.

According to the technique of the present disclosure, an offset of the center-of-gravity position of the humanoid robot can be reduced.

MODE FOR CARRYING OUT THE DISCLOSURE

Figure 1:
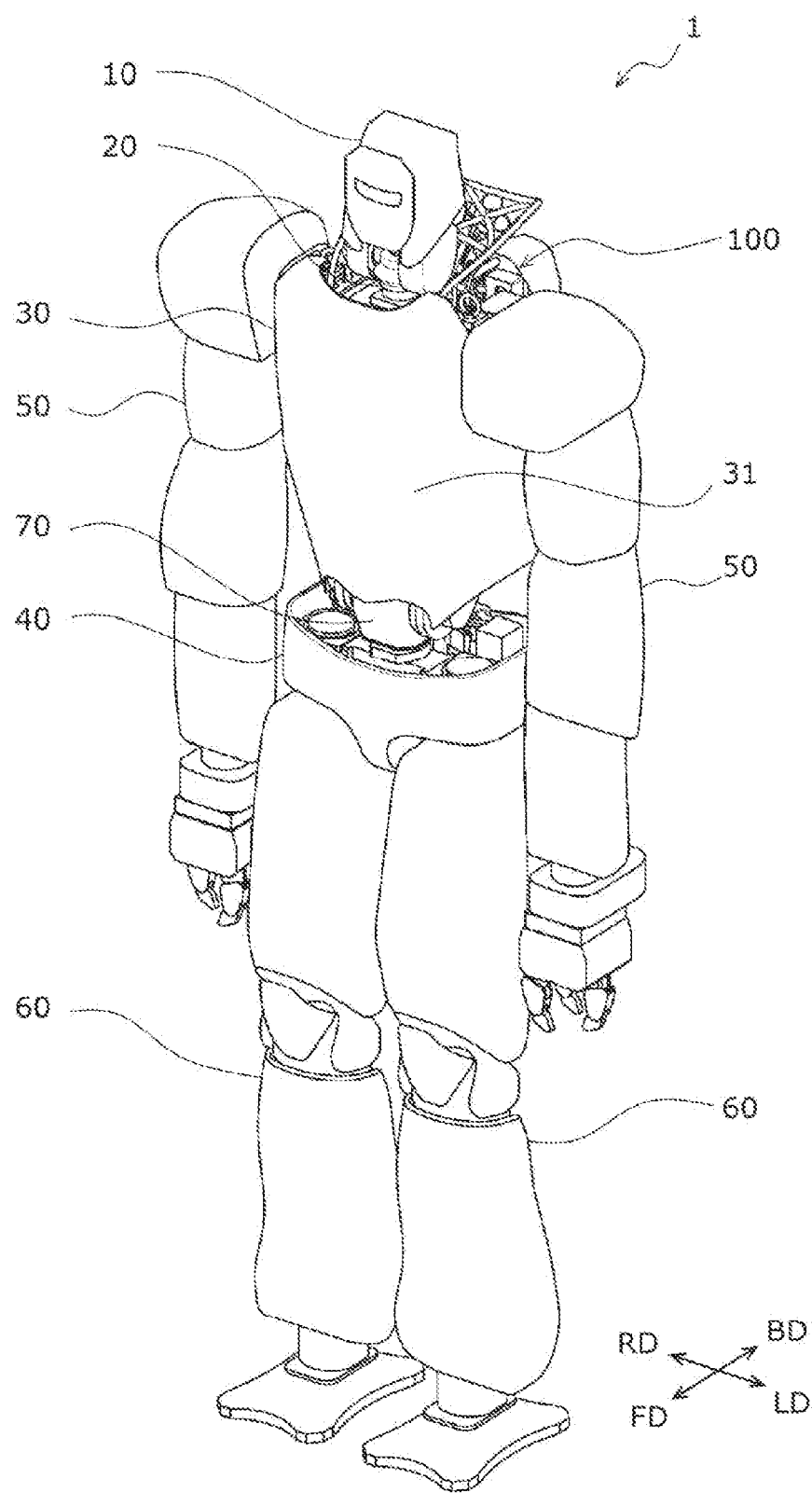
FIG. 1 is a perspective view illustrating one example of a humanoid robot according to one embodiment, when seen from the front.

Hereinafter, one embodiment of the present disclosure is described with reference to the drawings. Note that any embodiment which will be described below illustrates a comprehensive or concrete example. Further, among components in the following embodiment, components that are not described in an independent claim that illustrates the top concept will be described as arbitrary components. Each of the accompanying drawings is a schematic drawing, and is not necessarily illustrated exactly. Further, in each drawing, the same reference characters are assigned to substantially the same components, and redundant explanation may be omitted or simplified. The term "device" as used herein and the claims may not only mean a sole device, but also mean a system comprised of a plurality of devices.

<Configuration of Humanoid Robot>

Figure 2:
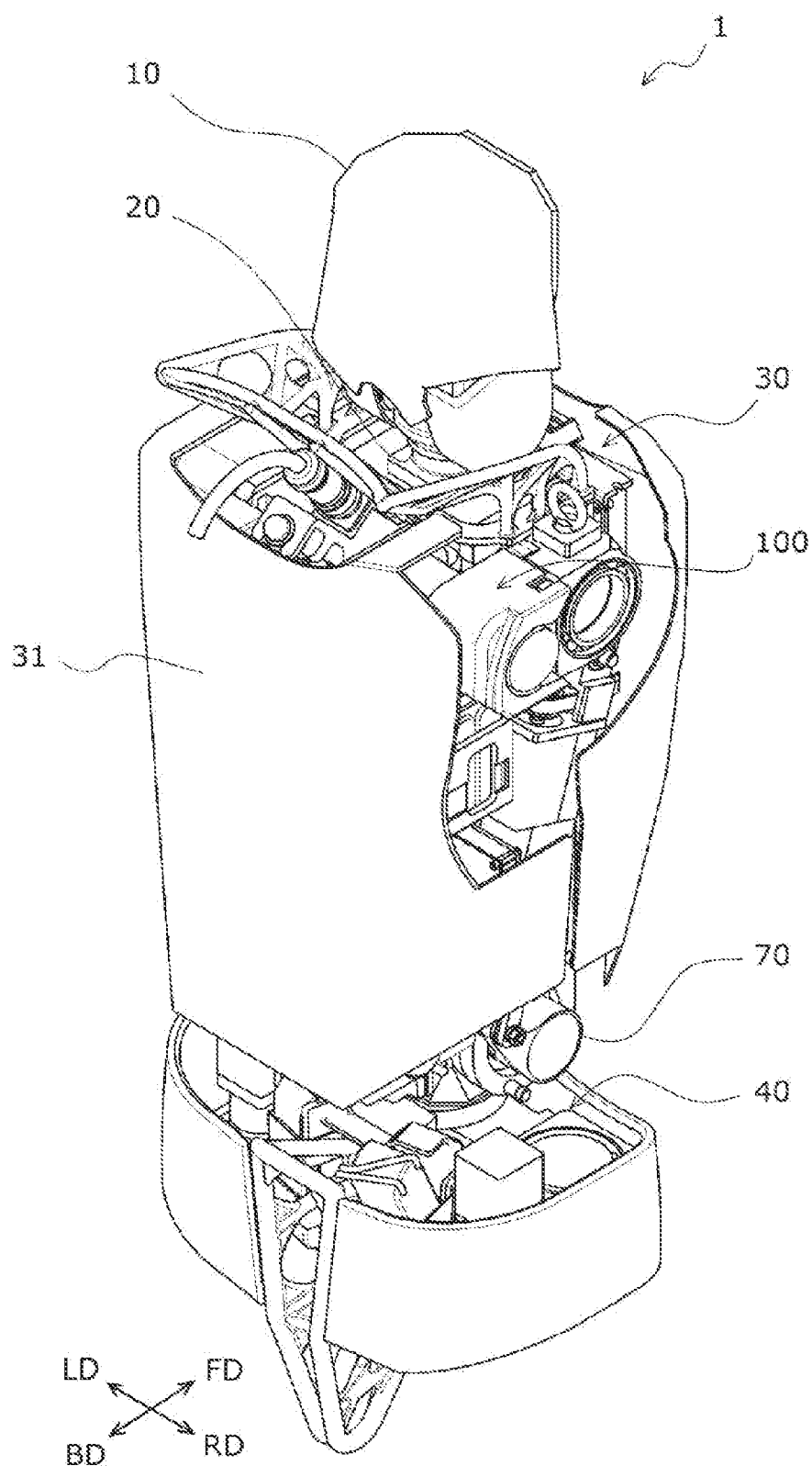
FIG. 2 is a perspective view illustrating one example of a configuration from a head to a lower body of the humanoid robot according to this embodiment, when seen from the rear.

FIG. 1 is a perspective view illustrating one example of a humanoid robot 1 according to this embodiment, when seen from the front. FIG. 2 is a perspective view illustrating one example of a configuration of the humanoid robot 1 according to this embodiment, from a head 10 to a lower body 40, when seen from the rear. As illustrated in FIGS. 1 and 2, the humanoid robot 1 according to this embodiment has the head 10, a neck 20, an upper body 30, the lower body 40, arms 50, and legs 60. The humanoid robot 1 is also referred to as a "humanoid" or "bipedal robot," which is configured to perform bipedal locomotion by controlling the drive of the legs 60. The humanoid robot 1 can also perform a work etc. similar to a human, by driving the arms 50 and the legs 60 to move hand parts at tip ends of the arms 50 and foot parts at tip ends of the legs 60.

Each of the arm 50 and the leg 60 has a plurality of links and joints which bendably connect the plurality of links, respectively. Each of the arm 50 and the leg 60 carry out the bending motion by adjacent links bending with respect to each other via the joint. The upper body 30 and the lower body 40 are connected to each other so as to be bendable via a joint 70. The upper body 30 can carry out a forward bending motion, a rearward bending motion, and a circumnutating motion to the left and right, with respect to the lower body 40. The lower body 40 may correspond to a human's pelvis, and the joint 70 may correspond to a human's waist. A drive is provided to each joint and it drives the bending motion or the circumnutating motion of the joint. The drive has a drive source, such as an electric motor such as a servomotor, and an actuator. In response to a control of operation thereof, the drive bends the link in a desired bending direction at a desired bending angle, or bends the upper body 30 in a desired bending direction at a desired bending angle and circumnutates the upper body 30 in a desired turning direction at a desired turning angle.

The upper body 30 is covered with cladding 31. For example, the cladding 31 is a plate-like cover. Note that, in FIG. 2, the cladding 31 is illustrated in a state where it is partially cut off. The humanoid robot 1 has a secondary battery unit 100 in the upper body 30 inside the cladding 31. The secondary battery unit 100 stores electricity, and supplies the power to devices which use power as a power source, such as the drive of the humanoid robot 1. The secondary battery unit 100 receives the supply of the power by being connected with an external power supply of the humanoid robot 1, and accumulates the power.

<Configuration of Secondary Battery Unit>

Figure 3:
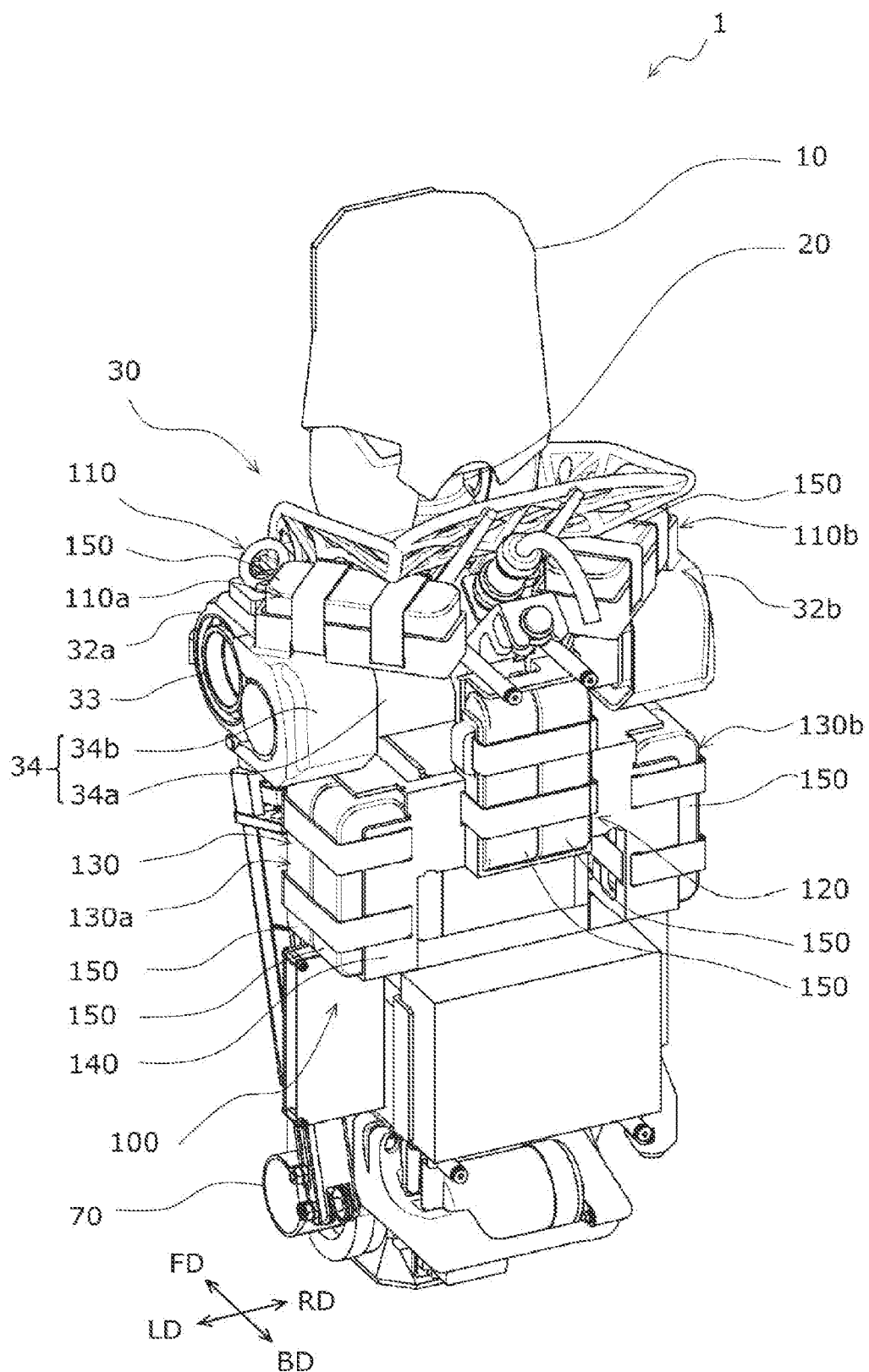
FIG. 3 is a perspective view illustrating one example of a body of the humanoid robot according to this embodiment in a state where cladding is removed, when seen from the rear.
Figure 4:
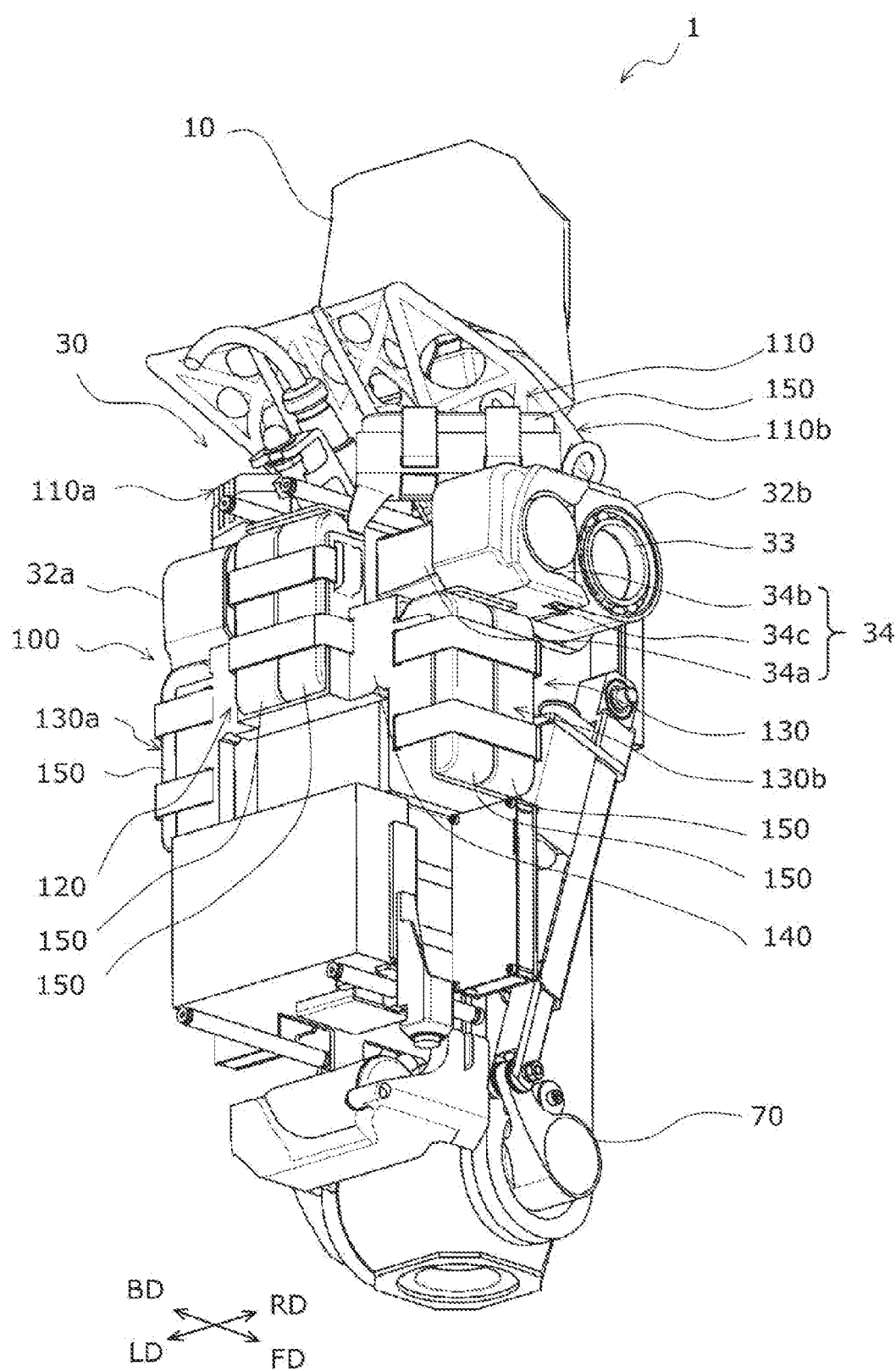
FIG. 4 is a perspective view illustrating one example of the body of the humanoid robot according to this embodiment in the state where the cladding is removed, when seen from the rear.
Figure 5:
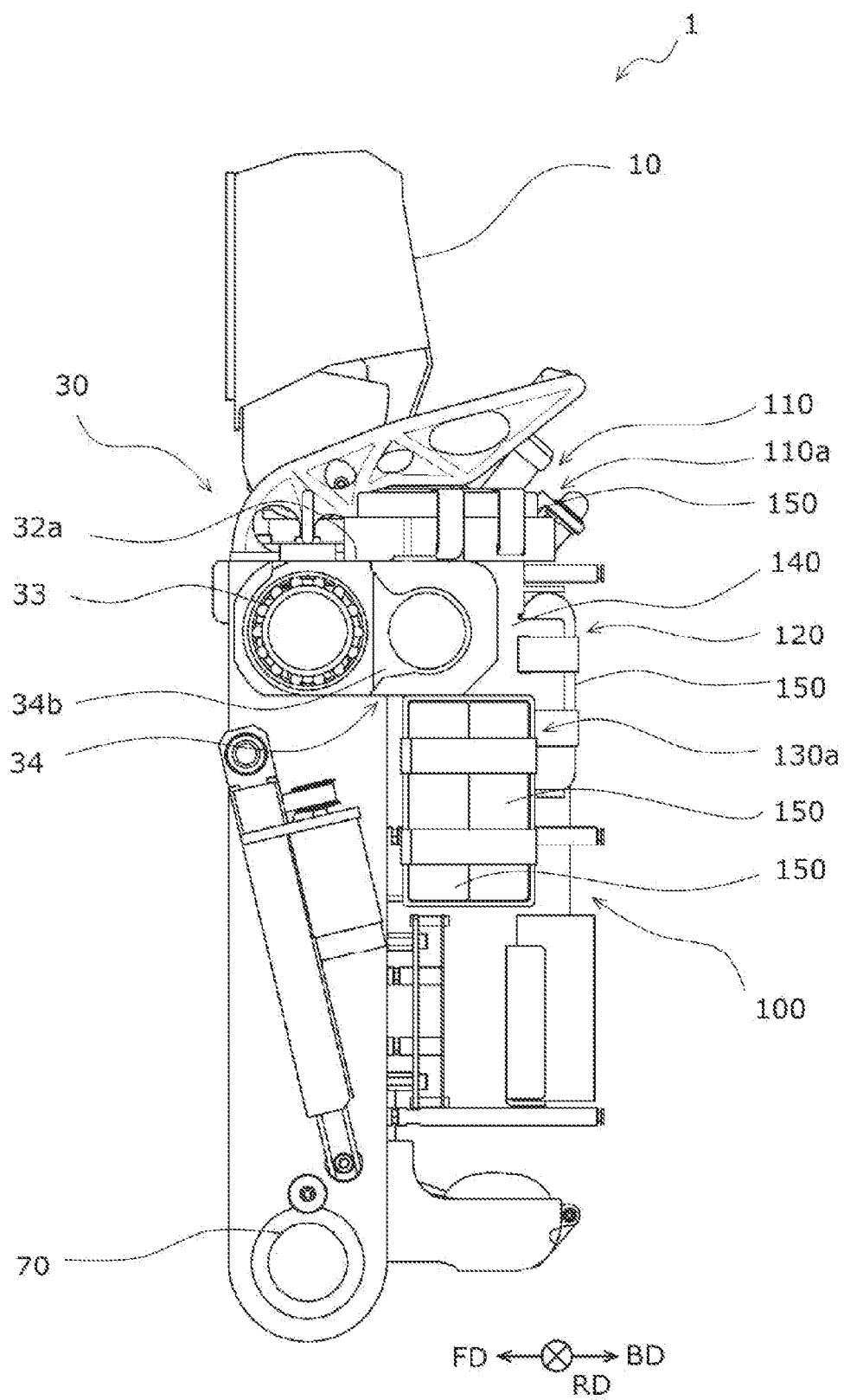
FIG. 5 is a side view illustrating one example of the body of the humanoid robot according to this embodiment in the state where the cladding is removed, when seen from one side.
Figure 6:
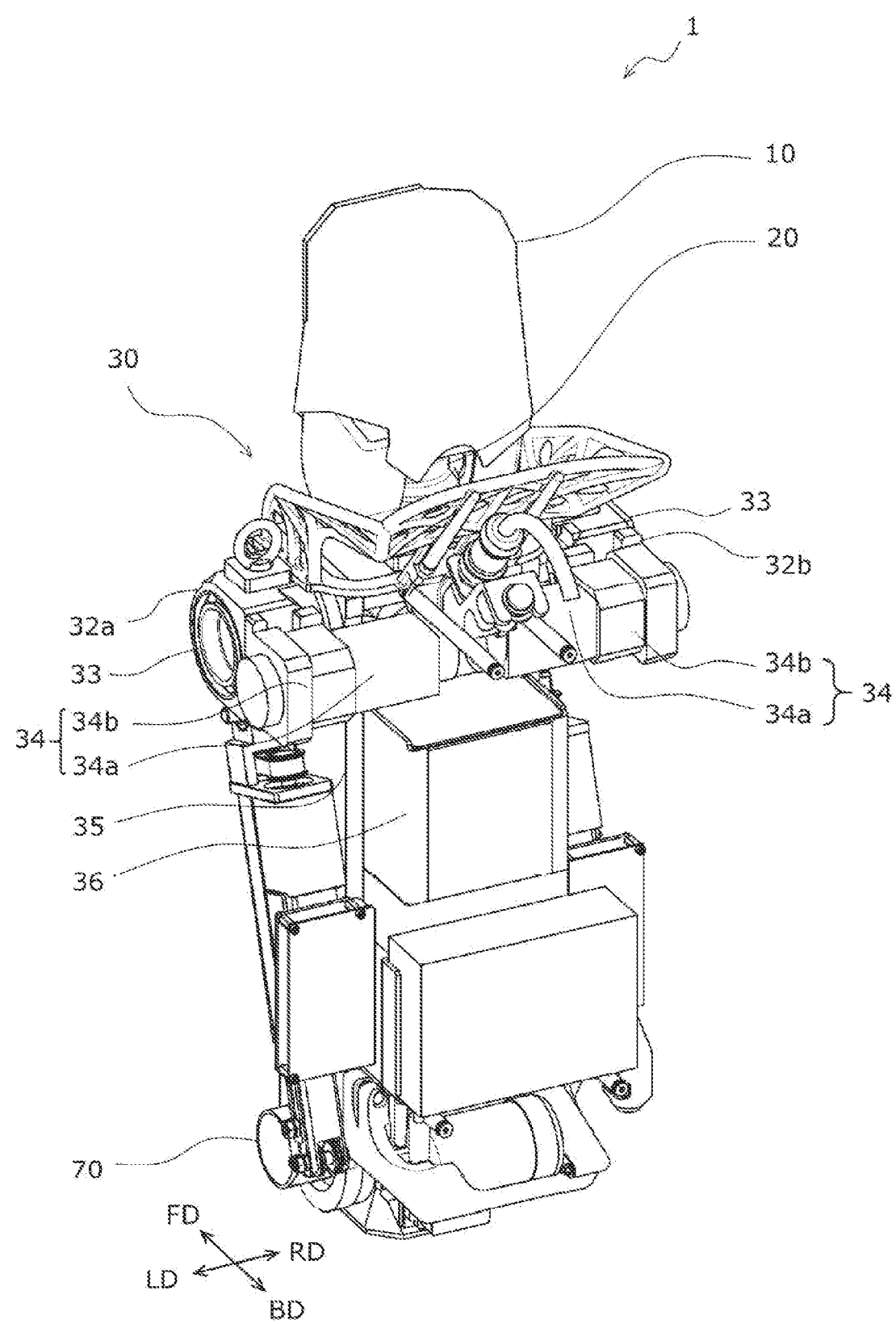
FIG. 6 is a perspective view illustrating one example of the body in a state where a secondary battery unit is removed in FIG. 3.

A configuration of the secondary battery unit 100 is described. FIGS. 3 and 4 are perspective views illustrating one example of the upper body 30 in the state where the cladding 31 of the humanoid robot 1 according to this embodiment is removed, when seen from the rear. FIG. 5 is a side view illustrating one example of the upper body 30 in the state where the cladding 31 of the humanoid robot 1 according to this embodiment is removed, when seen from one side. FIG. 6 is a perspective view illustrating one example of the upper body 30 in the state where the secondary battery unit 100 is removed in FIG. 3.

As illustrated in FIGS. 3 to 5, the secondary battery unit 100 is detachably attached to a back part of the upper body 30. Here, back parts of the upper body 30 and the lower body 40 correspond to the back and the buttocks of the humanoid robot 1, respectively, and is a part of the upper body 30 in the rearward bending direction. Front parts of the upper body 30 and the lower body 40 correspond to the chest and the abdomen of the humanoid robot 1, respectively. Further, on the basis of the humanoid robot 1 in the upright position, the rearward bending direction is referred to as a "back direction BD," the forward bending direction is referred to as a "front direction FD," the right side with respect to the front direction FD is referred to as a "right direction RD," and the left side with respect to the front direction FD is referred to as a "left direction LD."

The secondary battery unit 100 includes secondary battery modules 110-130 and a base 140. The secondary battery module 110 is a top secondary battery module disposed at an upper part of the upper body 30. The secondary battery module 120 is a back secondary battery module disposed at a back part of the upper body 30. The secondary battery module 130 is a side secondary battery module disposed at a side part of the upper body 30. The base 140 couples the secondary battery modules 110-130 to each other, and is detachably attached to the upper body 30 together with the secondary battery modules 110-130.

The top secondary battery module 110 and the side secondary battery module 130 are disposed around the upper body 30 in a direction which intersects with the front-and-rear direction of the upper body 30. For example, the top secondary battery module 110 and the side secondary battery module 130 are disposed around the upper body 30 in a direction perpendicular to the front-and-rear direction of the upper body 30. Such secondary battery modules 110-130 are disposed so as to surround the upper body 30. The back secondary battery module 120 is one example of a "first secondary battery module," and the top secondary battery module 110 and the side secondary battery module 130 are examples of a "second secondary battery module."

Each of the secondary battery modules 110-130 includes one or more secondary batteries 150. Each of the secondary battery modules 110-130 may include one or more integrated secondary batteries 150, or may include one or more separated secondary batteries 150. The secondary battery 150 is also referred to as a "rechargeable battery" which is electrically chargeable and dischargeable. The secondary battery 150 may be comprised of a lead secondary battery, a lithium-ion rechargeable battery, a nickel-hydrogen secondary battery, or a nickel-cadmium secondary battery.

The top secondary battery module 110 is comprised of a pair of top secondary battery modules 110*a* and 110*b*. The top secondary battery modules 110*a* and 110*b* are disposed on left and right shoulders 32*a* and 32*b* of the upper body 30 of the humanoid robot 1, respectively. Below, when distinguishing the two top secondary battery modules, they are expressed as "the top secondary battery module 110*a*" and "the top secondary battery module 110*b*," and when not distinguishing therebetween, each is expressed as "the top secondary battery module 110."

As illustrated in FIGS. 3 and 6, the shoulders 32*a* and 32*b* are provided to the upper body 30, and they are the joint parts between the left and right arms 50 and the upper body 30, respectively. Each of the shoulders 32*a* and 32*b* includes a joint 33 to which the arm 50 is connected, and a drive 34 for the joint 33. The drive 34 includes a servomotor 34*a* and a reduction gear 34*b*. The reduction gear 34*b* slows down a rotational speed of a rotational driving force of the servomotor 34*a* while increasing the rotational driving force, and transmits the rotational driving force to the joint 33. For example, the rotational driving force of the reduction gear 34*b* may be transmitted to the joint 33 via a drive belt or a gear mechanism.

As illustrated in FIGS. 3 to 5, the side secondary battery module 130 is comprised of a pair of side secondary battery modules 130*a* and 130*b*. The side secondary battery modules 130*a* and 130*b* are disposed at the left and right side parts of the upper body 30 of the humanoid robot 1, respectively. The side secondary battery modules 130*a* and 130*b* are disposed below the shoulders 32*a* and 32*b*, respectively. The side secondary battery modules 130*a* and 130*b* are disposed below the top secondary battery modules 110*a* and 110*b*, respectively. Note that the terms "up(ward)" and "above" as used herein refer to a direction from the legs 60 to the head 10 of the humanoid robot 1 in the upright position, and the terms "down(ward)" and "below" as used herein refer to a direction from the head 10 to the legs 60 of the humanoid robot 1. Below, when distinguishing the two side secondary battery modules from each other, they are expressed as "the side secondary battery module 130*a*" and "the side secondary battery module 130*b*," and when not distinguishing therebetween, each are expressed as "the side secondary battery module 130."

The single back secondary battery module 120 is disposed at a position between the pair of top secondary battery modules 110a and 110b, and between the pair of side secondary battery modules 130a and 130b. In this embodiment, the top secondary battery modules 110a and 110b are disposed at equidistance positions in the left direction LD and the right direction RD, centering on the back secondary battery module 120. The side secondary battery modules 130a and 130b are disposed at equidistance positions in the left direction LD and the right direction RD, centering on the back secondary battery module 120.

Figure 7:
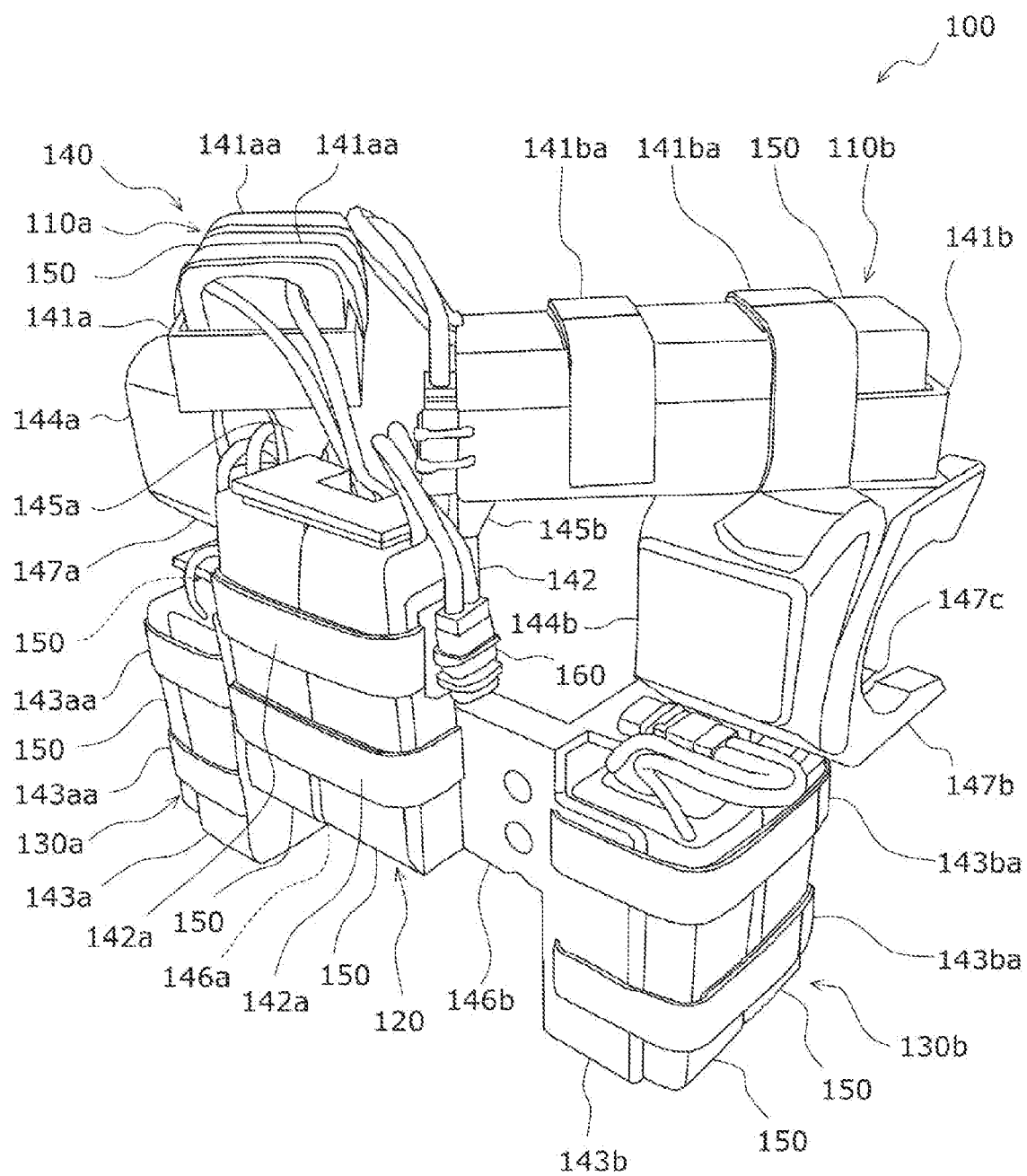
FIG. 7 is a perspective view illustrating one example of a configuration of the secondary battery unit according to this embodiment.

FIG. 7 is a perspective view illustrating one example of a configuration of the secondary battery module 100 according to this embodiment. As illustrated in FIG. 7, the base 140 is a frame-like member. The base 140 detachably carries the top secondary battery modules 110a and 110b, the back secondary battery module 120, and the side secondary battery modules 130a and 130b. Such a base 140 may be made of non-conductive material, such as plastic or resin.

The base 140 includes a top left accommodating part 141a, top left fixing parts 141aa, a top right accommodating part 141b, top right fixing parts 141ba, a back accommodating part 142, back fixing parts 142a, a side left accommodating part 143a, side left fixing parts 143aa, a side right accommodating part 143b, and side right fixing parts 143ba. The back accommodating part 142 is one example of a "first accommodating part," and the back fixing part 142a is one example of a "first fixing part." The top left accommodating part 141a, the top right accommodating part 141b, the side left accommodating part 143a, and the side right accommodating part 143b are examples of a "second accommodating part." The top left fixing part 141aa, the top right fixing part 141ba, the side left fixing part 143aa, and the side right fixing part 143ba are examples of a "second fixing part."

In addition, the base 140 includes a first left accommodation connecting part 144a which couples the top left accommodating part 141a to the side left accommodating part 143a, a second left accommodation connecting part 145a which couples the top left accommodating part 141a to the back accommodating part 142, a third left accommodation connecting part 146a which couples the back accommodating part 142 to the side left accommodating part 143a, a first right accommodation connecting part 144b which couples the top right accommodating part 141b to the side right accommodating part 143b, a second right accommodation connecting part 145b which couples the top right accommodating part 141b to the back accommodating part 142, and a third right accommodation connecting part 146b which couples the back accommodating part 142 to the side right accommodating part 143b.

In this embodiment, although the first left accommodation connecting part 144a, the second left accommodation connecting part 145a, the first right accommodation connecting part 144b, and the second right accommodation connecting part 145b extend in the up-and-down direction, while the secondary battery unit 100 is attached to the upper body 30 in the upright position, their extending direction may be directions other than the up-and-down direction. Although the third left accommodation connecting part 146a and the third right accommodation connecting part 146b extend in the left-and-right direction, their extending direction may be directions other than the left-and-right direction.

Each of the accommodating parts 141a, 141b, 142, 143a, and 143b has a rectangular cylindrical shape with a bottom (i.e., has a box shape which opens at one face), which accommodates the secondary battery modules 110a, 110b, 120, 130a, and 130b of a rectangular parallelepiped shape.

Further, each of the accommodating parts 141a, 141b, 142, 143a, and 143b opens outwardly from the upper body 30 in the state where the secondary battery unit 100 is attached to the upper body 30. Thus, in the state where the secondary battery unit 100 is attached to the upper body 30, the secondary battery 150 can be accommodated into the accommodating part from outside the upper body 30, and can be removed as well (i.e., a replacement is possible).

The fixing parts 141aa, 141ba, 142a, 143aa, and 143ba are disposed at the accommodating parts 141a, 141b, 142, 143a, and 143b, respectively. The fixing parts 141aa, 141ba, 142a, 143aa, and 143ba fix the secondary battery modules 110a, 110b, 120, 130a, and 130b which are accommodated in the accommodating parts 141a, 141b, 142, 143a, and 143b to the accommodating parts, respectively. In this embodiment, although each of the fixing parts 141aa, 141ba, 142a, 143aa, and 143ba includes a belt-like Hook-and-Loop fastener which detachably fixes the secondary battery modules 110a, 110b, 120, 130a, and 130b to the accommodating parts 141a, 141b, 142, 143a, and 143b, respectively, they may have any configuration as long as the above-described fixation is possible. One example of the Hook-and-Loop fastener is Velcro®. The belt-like Hook-and-Loop fastener fixes the secondary battery module to the accommodating part by being wound around the external surface of the secondary battery module.

In this embodiment, the top left accommodating part 141a can accommodate the top secondary battery module 110a including one secondary battery 150. The top right accommodating part 141b can accommodate the top secondary battery module 110b including one secondary battery 150. The back accommodating part 142 can accommodate the back secondary battery module 120 including two secondary batteries 150. In the state where the secondary battery unit 100 is attached to the upper body 30, the two secondary batteries 150 accommodated in the back accommodating part 142 are lined up in the left-and-right direction along the cladding 31 of the upper body 30 so as not to project in the back direction BD. The side left accommodating part 143a can accommodate the side secondary battery module 130a including two secondary batteries 150. The side right accommodating part 143b can accommodate the side secondary battery module 130b including two secondary batteries 150. In the state where the secondary battery unit 100 is attached to the upper body 30, the two secondary batteries 150 which are accommodated in the side accommodating parts 143a and 143b are lined up in the front-and-rear direction along the cladding 31 of the upper body 30, so as not to project in the left direction LD and the right direction RD, respectively. The center of gravity in the state where it is attached to the upper body 30 in such a secondary battery unit 100 is located at a position which is offset downwardly. But, the offset in the back direction BD is suppressed.

The base 140 includes attaching parts 147a and 147b in the first accommodation connecting parts 144a and 144b. The attaching parts 147a and 147b are configured so as to detachably fit onto the shoulders 32a and 32b, respectively. In this embodiment, although the attaching parts 147a and 147b is comprised of a U-shaped member which opens in the front direction FD, they may have any configuration as long as they are detachably fixed to the shoulders 32a and 32b. The attaching parts 147a and 147b are examples of a "fitting part."

The attaching parts 147a and 147b are configured to be fitted onto to the drives 34 of the shoulders 32a and 32b in the front direction FD from the rear, respectively. The attaching parts 147a and 147b fit onto outer circumferential surfaces of the drives 34 of the shoulders 32*a* and 32*b* from outside, and they are fixed to the shoulders 32*a* and 32*b*, respectively. In this embodiment, each of the attaching parts 147*a* and 147*b* fits onto upper and lower outer circumferential surfaces of the drive 34. Further, a recess 147*c* formed in a lower part of each of the attaching parts 147*a* and 147*b* may be configured to engage or fit onto a protrusion 34*c* (see FIG. 4) formed in the lower outer circumferential surface of the drive 34. Therefore, each of the attaching parts 147*a* and 147*b* is positioned with respect to the drive 34. Further, the recess 147*c* and the protrusion 34*c* may be configured to fit or engage by snap fit etc. so that they are not easily escaped from the fitting or engagement state. The base 140 is fixed to the upper body 30 in the up-and-down direction, the left-and-right direction, and the front-and-rear direction by fitting the attaching parts 147*a* and 147*b* onto the shoulders 32*a* and 32*b*, respectively. The fitting of the attaching parts 147*a* and 147*b* is released by pulling the attaching parts 147*a* and 147*b* in the back direction BD, respectively, and thereby, the base 140 is removed from the upper body 30.

Such a base 140 may be comprised of a single member in which parts continue so as to be integrated, or may be formed by connecting a plurality of members. The secondary battery unit 100 constitutes a single module in which all the secondary battery modules 110*a*, 110*b*, 120, 130*a*, and 130*b*, and the base 140 are integrated. Since the base 140 is attachable to and detachable from the upper body 30, the secondary battery unit 100 makes it possible to attach and detach the secondary battery modules 110*a*, 110*b*, 120, 130*a*, and 130*b* to/from the upper body 30 all at once. Further, the base 140 is configured to arrange the secondary battery modules 110*a*, 110*b*, 120, 130*a*, and 130*b* so as not to interfere with the head 10, the neck 20, the shoulders 32*a* and 32*b*, and the joint 70, avoiding their operating areas.

By connecting a terminal 160 extending from each of the secondary battery modules 110*a*, 110*b*, 120, 130*a*, and 130*b* via a cable (not illustrated) with a given terminal (not illustrated) of the upper body 30, each of the secondary battery modules 110*a*, 110*b*, 120, 130*a*, and 130*b* is electrically connected with the humanoid robot 1. Although in this embodiment a movable terminal of the upper body 30 is connected to the terminal 160 fixed to the base 140, a terminal 160 movable to the base 140 may be connected to the terminal of the upper body 30.

Note that a fastener such as the Hook-and-Loop fastener may be disposed at the terminal 160. Further, each terminal 160 may be held by the fixing part 141*aa*, 141*ba*, 142*a*, 143*aa*, or 143*ba*, or other constituent members via the fastener. Therefore, it becomes possible to smoothly perform the attachment and detachment of the secondary battery unit 100 to/from the upper body 30, without being influenced by the terminal 160, the cable (not illustrated), etc.

As illustrated in FIG. 6, the upper body 30 includes an electrical equipment box 36 inside a skeleton frame 35 which constitutes the frame of the upper body 30. The electrical equipment box 36 includes, therein, the electrical equipment including a circuit board which controls operation of each drive etc. of the humanoid robot 1.

As illustrated in FIGS. 3, 6, and 7, in the secondary battery unit 100 attached to the upper body 30, the back secondary battery module 120 is adjacent to the electrical equipment box 36 via the back accommodating part 142 in the back direction BD from the electrical equipment box 36. The side secondary battery module 130*a* is adjacent to the electrical equipment box 36 via the side left accommodating part 143*a* in the left direction LD from the electrical equipment box 36. The side secondary battery module 130*b* is adjacent to the electrical equipment box 36 via the side right accommodating part 143*b* in the right direction RD from the electrical equipment box 36.

The back secondary battery module 120 and the side secondary battery modules 130*a* and 130*b* also function as a protection member of the electrical equipment box 36. Further, by making the base 140 from a resin with low thermal conductivity etc., heat transfer between the electrical equipment box 36 and the back secondary battery module 120 is suppressed, and heat transfer between the electrical equipment box 36 and the side secondary battery modules 130*a* and 130*b* is suppressed. Therefore, the electrical equipment inside the electrical equipment box 36 is suppressed from being high in the temperature.

Moreover, the shoulders 32*a* and 32*b* project from the electrical equipment box 36 in the left direction LD and the right direction RD, respectively. The side secondary battery modules 130*a* and 130*b* are fitted below the shoulders 32*a* and 32*b* so that they do not project from the shoulders 32*a* and 32*b* in the left direction LD and the right direction RD, respectively. That is, the side secondary battery modules 130*a* and 130*b* are fitted in hollows formed in the left and right flanks of the upper body 30, respectively. Therefore, it is suppressed that the side secondary battery modules 130*a* and 130*b* interfere with the left and right arms 50.

Effects Etc

The secondary battery unit 100 according to the above embodiment includes the back secondary battery module 120 disposed on the back part which is at least either one of the front part or the back part of the upper body 30 of the humanoid robot 1, the top secondary battery module 110 and the side secondary battery module 130 disposed around the upper body 30 in the direction which intersects with the front-and-rear direction of the upper body 30, the base 140 which couples the secondary battery modules 110-130 to each other. The base 140 is detachably attached to the upper body 30 along with the secondary battery modules 110-130.

According to the above configuration, the secondary battery modules 110-130 are disposed so as to be distributed around the upper body 30. Therefore, in the humanoid robot 1 carrying the secondary battery unit 100, it may be suppressed that the center-of-gravity position of the humanoid robot 1 is deviated and offset from the center axis of the humanoid robot 1 (i.e., the balance of the center of gravity is offset). For example, the center axis of the humanoid robot 1 may be the axis which passes through the head 10 and the neck 20 and extends in the up-and-down direction, or may be the center axis when the humanoid robot 1 turns left and right. Further, the secondary battery modules 110-130 are collectively attached and detached to/from the upper body 30, together with the base 140. Therefore, the attachment and detachment of the secondary battery modules 110-130 become easier.

The secondary battery modules 110-130 may be disposed so as to surround the upper body 30. According to this configuration, the secondary battery modules 110-130 can be disposed so as to be distributed around the upper body 30.

The secondary battery modules 110 and 130 may be disposed at the upper part and the side part of the upper body 30. According to this configuration, the secondary battery modules 110-130 can be disposed so as to be distributed to the upper part, the back part, and the side part of the upper body 30.

The base 140 may include the attaching parts 147*a* and 147*b* as the fitting parts which detachably fit onto the upper body 30 of the humanoid robot 1. For example, the attaching parts 147a and 147b may be configured so as to fit onto the shoulders 32a and 32b of the upper body 30, respectively. Further, the attaching parts 147a and 147b may be disposed at the first accommodation connecting parts 144a and 144b of the base 140 which couple the top secondary battery modules 110a and 110b and the side secondary battery modules 130a and 130b, respectively. According to this configuration, the attachment and detachment of the base 140 to/from the upper body 30 become easier.

Moreover, the top secondary battery modules 110a and 110b may be disposed so as to be placed on the shoulders 32a and 32b of the upper body 30. Note that the shoulders 32a and 32b may be joint parts between the left and right arms 50 and the upper body 30 of the humanoid robot 1. According to this configuration, the layout of top secondary battery modules 110a and 110b to the upper body 30 becomes easier. In addition, the top secondary battery modules 110a and 110b are stably supported by the shoulders 32a and 32b from below.

The base 140 may include the top accommodating parts 141a and 141b which accommodate the top secondary battery modules 110a and 110b, and the top fixing parts 141aa and 141ba which fix the top secondary battery modules 110a and 110b to the top accommodating parts 141a and 141b. Further, the base 140 may include the back accommodating part 142 which accommodates the back secondary battery module 120, and the back fixing part 142a which fixes the back secondary battery module 120 to the back accommodating part 142. The base 140 may include the side accommodating parts 143a and 143b which accommodate the side secondary battery modules 130a and 130b, and the side fixing parts 143aa and 143ba which fix the side secondary battery modules 130a and 130b to the side accommodating parts 143a and 143b. According to this configuration, it becomes easy to attach the top secondary battery modules 110a and 110b, the back secondary battery module 120, and the side secondary battery modules 130a and 130b to the given positions of the base 140.

In the state where the secondary battery unit 100 is attached to the upper body 30, the top accommodating parts 141a and 141b may be disposed so that they open outwardly from the upper body 30 so that accommodation and removal of the top secondary battery modules 110a and 110b from outside the upper body 30 are possible, respectively. The back accommodating part 142 may be disposed so that they open outwardly from the upper body 30 so that accommodation and removal of the back secondary battery module 120 from outside the upper body 30 are possible. The side accommodating parts 143a and 143b may be disposed so that they open outwardly from the upper body 30 so that accommodation and removal of the side secondary battery modules 130a and 130b from outside the upper body 30 are possible, respectively. According to this configuration, the replacement of the secondary battery module in the state where the secondary battery unit 100 is attached to the upper body 30 is possible, and therefore, the replacement of the secondary battery module becomes easier.

Further, the base 140 may include the first accommodation connecting parts 144a and 144b which couple the top accommodating parts 141a and 141b to the side accommodating parts 143a and 143b, respectively, the second accommodation connecting parts 145a and 145b which couple the top accommodating parts 141a and 141b to the back accommodating part 142, respectively, and the third accommodation connecting parts 146a and 146b which couple the back accommodating part 142 to the side accommodating parts 143a and 143b, respectively. According to this configuration, since the accommodating parts 141a, 141b, 142, 143a, and 143b are connected mutually, it becomes possible to hold the position of each accommodating part on the base 140 (i.e., a relative position of each accommodating part).

Further, the fixing parts 141aa, 141ba, 142a, 143aa, and 143ba may include a Hook-and-Loop fastener which detachably fixes the secondary battery modules 110a, 110b, 120, 130a, and 130b to the accommodating parts 141a, 141b, 142, 143a, and 143b, respectively. According to this configuration, operation for fixing and releasing the secondary battery modules 110a, 110b, 120, 130a, and 130b becomes simpler.

Further, the secondary battery unit 100 may be provided with a pair of top secondary battery modules 110a and 110b, and a pair of side secondary battery modules 130a and 130b. Further, the top secondary battery modules 110a and 110b may be disposed so as to be placed on the left and right shoulders 32a and 32b of the humanoid robot 1, respectively. Further, the side secondary battery modules 130a and 130b may be disposed at the left and right side parts of the upper body 30, below the joint parts between the left and right arms 50 and the upper body 30 of the humanoid robot 1, respectively. Further, the back secondary battery module 120 may be disposed at the position between the pair of top secondary battery modules 110a and 110b, and between the pair of side secondary battery modules 130a and 130b. According to this configuration, it becomes possible to symmetrically dispose the top secondary battery modules 110a and 110b, the side secondary battery modules 130a and 130b, and the back secondary battery module 120 in the left-and-right direction with respect to the center axis of the humanoid robot 1. Therefore, it is suppressed that the center of gravity of the humanoid robot 1 is located at the position which is offset in the left-and-right direction.

The humanoid robot 1 according to this embodiment is provided with the secondary battery unit 100 and the upper body 30. According to this configuration, similar effects to the secondary battery unit 100 according to the above embodiment can be acquired.

Other Embodiments

Although the example of the embodiment of the present disclosure is described above, the present disclosure is not limited to the above embodiment. That is, various modifications and improvements are possible without departing from the scope of the present disclosure. For example, those in which various modifications are applied to the embodiment, and the modes established by combining components in different embodiments, are also encompassed within the scope of the present disclosure.

For example, although the secondary battery unit 100 according to the above embodiment is provided with the top secondary battery modules 110a and 110b, the back secondary battery module 120, and the side secondary battery modules 130a and 130b, it is not limited to this configuration. For example, the secondary battery unit 100 may not be provided with the top secondary battery modules 110a and 110b, the back secondary battery module 120, or the side secondary battery modules 130a and 130b.

For example, the secondary battery unit 100 may be provided with the back secondary battery module 120 disposed at the back part of the upper body 30, and the side secondary battery modules 130a and 130b disposed at the side parts of the upper body 30. According to the above configuration, it becomes possible to lower the center-ofgravity position of the humanoid robot 1 to which the secondary battery unit 100 is attached. Alternatively, the secondary battery unit 100 may be provided with the top secondary battery modules 110a and 110b and the back secondary battery module 120.

Further, the secondary battery unit 100 may be provided with a front secondary battery module disposed at the front part of the upper body 30, instead of the back secondary battery module 120. In this case, the secondary battery unit 100 may be provided with the front secondary battery module, the top secondary battery modules 110a and 110b, and the side secondary battery modules 130a and 130b, or may be provided with the front secondary battery module, and the side secondary battery modules 130a and 130b, or may be provided with the front secondary battery module, and the top secondary battery modules 110a and 110b.

Moreover, the secondary battery unit 100 may be provided with further secondary battery module(s). For example, the further secondary battery modules may be disposed at the front part of the upper body 30 and the lower body 40.

In the secondary battery unit 100 according to the above embodiment, although the top secondary battery modules 110a and 110b are disposed so as to be separated from each other, they may be integrated. Alternatively, the top secondary battery module 110 may include three or more separately-disposed secondary battery modules. Similarly, although the side secondary battery modules 130a and 130b are disposed so as to be separated from each other, they may be integrated. Alternatively, the side secondary battery module 130 may include three or more separately-disposed secondary battery modules. Further, the back secondary battery module 120 may include two or more separately-disposed secondary battery modules.

Moreover, although in the secondary battery unit 100 according to the above embodiment, the base 140 is attached to the upper body 30 by fitting onto the shoulders 32a and 32b, it is not limited to this configuration. For example, the base 140 may be configured to fit onto the upper body 30 or the neck 20. Alternatively, the base 140 may be configured to be attached to the upper body 30 by a fastening member such as screws.

Further, although the secondary battery unit 100 according to the above embodiment is disposed at the back part of the upper body 30, it is not limited to this configuration. For example, the secondary battery unit 100 may be disposed at the front part of the upper body 30, or may be disposed over the front part and the back part of the upper body 30. Alternatively, the secondary battery unit 100 may be disposed at the back part, the front part, or both the front part and the back part of the lower body 40. Further, the secondary battery unit 100 may be disposed over the upper body 30 and the lower body 40. For example, at least one of the secondary battery modules may be disposed at the front part, the back part, the left and right side parts of the lower body 40, or the crotch part between the legs 60.

What is claimed is:

1. A humanoid robot comprising:
   a body having one or more projecting parts projecting in a sideward direction of the humanoid robot;
   a first secondary battery module disposed in at least one of a front part or a back part of the body of a humanoid robot;
   a second secondary battery module disposed around the body in a direction intersecting with a front-and-rear direction of the body; and
   a base coupling the first secondary battery module to the second secondary battery module, wherein
   the base is detachably attached to the body, together with the first secondary battery module and the second secondary battery module; and
   the second secondary battery module is fitted in hollow portions of the body adjacent to and disposed around the one or more projecting parts such that the second secondary battery module does not project from the hollow portions of the body and thereby does not interfere with operation of the humanoid robot.

2. The humanoid robot of claim 1, wherein the first secondary battery module and the second secondary battery module are disposed so as to surround the body.

3. The humanoid robot of claim 2, wherein the second secondary battery module is disposed at a side part of the body.

4. The humanoid robot of claim 3, wherein the base includes:
   a first accommodating part configured to accommodate the first secondary battery module;
   a first fixing part configured to fix the first secondary battery module to the first accommodating part;
   a second accommodating part configured to accommodate the second secondary battery module; and
   a second fixing part configured to fix the second secondary battery module to the second accommodating part.

5. The humanoid robot of claim 4, wherein, the first accommodating part and the second accommodating part are disposed so as to open outwardly from the body so that accommodation and removal of the first secondary battery module and the second secondary battery module from outside the body are possible.

6. The humanoid robot of claim 2, wherein the second secondary battery module includes a plurality of second secondary battery modules, the plurality of second secondary battery modules being disposed at an upper part and a side part of the body.

7. The humanoid robot of claim 6, wherein the base includes:
   a first accommodating part configured to accommodate the first secondary battery module;
   a first fixing part configured to fix the first secondary battery module to the first accommodating part;
   a second accommodating part configured to accommodate the second secondary battery module; and
   a second fixing part configured to fix the second secondary battery module to the second accommodating part.

8. The humanoid robot of claim 7, wherein, the first accommodating part and the second accommodating part are disposed so as to open outwardly from the body so that accommodation and removal of the first secondary battery module and the second secondary battery module from outside the body are possible.

9. The humanoid robot of claim 1, wherein the second secondary battery module is disposed at a side part of the body.

10. The humanoid robot of claim 1, wherein the second secondary battery module includes a plurality of second secondary battery modules, the plurality of second secondary battery modules being disposed at an upper part and a side part of the body.

11. The humanoid robot of claim 10, wherein the base includes:
    a first accommodating part configured to accommodate the first secondary battery module;

a first fixing part configured to fix the first secondary battery module to the first accommodating part;
a second accommodating part configured to accommodate the second secondary battery module; and
a second fixing part configured to fix the second secondary battery module to the second accommodating part.

12. The humanoid robot of claim 11, wherein, the first accommodating part and the second accommodating part are disposed so as to open outwardly from the body so that accommodation and removal of the first secondary battery module and the second secondary battery module from outside the body are possible.

13. The humanoid robot of claim 1, wherein the base includes:
a first accommodating part configured to accommodate the first secondary battery module;
a first fixing part configured to fix the first secondary battery module to the first accommodating part;
a second accommodating part configured to accommodate the second secondary battery module; and
a second fixing part configured to fix the second secondary battery module to the second accommodating part.

14. The humanoid robot of claim 13, wherein, the first accommodating part and the second accommodating part are disposed so as to open outwardly from the body so that accommodation and removal of the first secondary battery module and the second secondary battery module from outside the body are possible.

15. The humanoid robot of claim 1, wherein the base includes a fitting part configured to detachably fit to the body.

16. A humanoid robot comprising:
a body having one or more projecting parts projecting in a sideward direction of the humanoid robot;
a first secondary battery module disposed at at least one of a front part or a back part of the body of a humanoid robot;
a second secondary battery module disposed around the body in a direction intersecting with a front-and-rear direction of the body; and
a base coupling the first secondary battery module to the second secondary battery module, wherein
the base is detachably attached to the body, together with the first secondary battery module and the second secondary battery module; and
the second secondary battery module is fitted in hollow portions of the body adjacent to and disposed around the one or more projecting part such that the second secondary battery module does not project from the hollow portions of the body and thereby does not interfere with operation of the humanoid robot, wherein
the first secondary battery module and the second secondary battery module are disposed so as to surround the body, and
the base includes:
a first accommodating part configured to accommodate the first secondary battery module;
a first fixing part configured to fix the first secondary battery module to the first accommodating part;
a second accommodating part configured to accommodate the second secondary battery module; and
a second fixing part configured to fix the second secondary battery module to the second accommodating part.

17. The humanoid robot of claim 16, wherein, the first accommodating part and the second accommodating part are disposed so as to open outwardly from the body so that accommodation and removal of the first secondary battery module and the second secondary battery module from outside the body are possible.

18. A humanoid robot comprising:
a body having one or more projecting parts projecting in a sideward direction of the humanoid robot;
a first secondary battery module disposed at at least one of a front part or a back part of the body of a humanoid robot;
a second secondary battery module disposed around the body in a direction intersecting with a front-and-rear direction of the body; and
a base coupling the first secondary battery module to the second secondary battery module, wherein
the base is detachably attached to the body, together with the first secondary battery module and the second secondary battery module; and
the second secondary battery module is fitted in hollow portions of the body adjacent to and disposed around the one or more projecting parts such that the second secondary battery module does not project from the hollow portions of the body and thereby does not interfere with operation of the humanoid robot, wherein
the second secondary battery module is disposed at a side part of the body, and
the base includes:
a first accommodating part configured to accommodate the first secondary battery module;
a first fixing part configured to fix the first secondary battery module to the first accommodating part;
a second accommodating part configured to accommodate the second secondary battery module; and
a second fixing part configured to fix the second secondary battery module to the second accommodating part.

19. The humanoid robot of claim 18, wherein, the first accommodating part and the second accommodating part are disposed so as to open outwardly from the body so that accommodation and removal of the first secondary battery module and the second secondary battery module from outside the body are possible.

* * * * *

UNITED STATES PATENT AND TRADEMARK OFFICE
CERTIFICATE OF CORRECTION

PATENT NO. : 12,283,704 B2
APPLICATION NO. : 17/638209
DATED : April 22, 2025
INVENTOR(S) : Masayuki Kamon et al.

It is certified that error appears in the above-identified patent and that said Letters Patent is hereby corrected as shown below:

In the Claims

Claims 3-19 should read:

3. The humanoid robot of claim 1, wherein the second secondary battery module is disposed at a side part of the body.

4. The humanoid robot of claim 1, wherein the second secondary battery module includes a plurality of second secondary battery modules, the plurality of second secondary battery modules being disposed at an upper part and a side part of the body.

5. The humanoid robot of claim 1, wherein the base includes:
    a first accommodating part configured to accommodate the first secondary battery module;
    a first fixing part configured to fix the first secondary battery module to the first accommodating part;
    a second accommodating part configured to accommodate the second secondary battery module; and
    a second fixing part configured to fix the second secondary battery module to the second accommodating part.

6. The humanoid robot of claim 5, wherein, the first accommodating part and the second accommodating part are disposed so as to open outwardly from the body so that accommodation and removal of the first secondary battery module and the second secondary battery module from outside the body are possible.

7. The humanoid robot of claim 1, wherein the base includes a fitting part configured to detachably fit to the body.

8. The humanoid robot of claim 2, wherein the second secondary battery module is disposed at a side part of the body.

Signed and Sealed this
Twelfth Day of August, 2025

Coke Morgan Stewart
*Acting Director of the United States Patent and Trademark Office*

9. The humanoid robot of claim 2, wherein the second secondary battery module includes a plurality of second secondary battery modules, the plurality of second secondary battery modules being disposed at an upper part and a side part of the body.

10. A humanoid robot comprising:
   a body having one or more projecting parts projecting in a sideward direction of the humanoid robot;
   a first secondary battery module disposed at at least one of a front part or a back part of the body of a humanoid robot;
   a second secondary battery module disposed around the body in a direction intersecting with a front-and-rear direction of the body; and
   a base coupling the first secondary battery module to the second secondary battery module, wherein
   the base is detachably attached to the body, together with the first secondary battery module and the second secondary battery module; and
   the second secondary battery module is fitted in hollow portions of the body adjacent to and disposed around the one or more projecting part such that the second secondary battery module does not project from the hollow portions of the body and thereby does not interfere with operation of the humanoid robot, wherein
   the first secondary battery module and the second secondary battery module are disposed so as to surround the body, and
   the base includes:
      a first accommodating part configured to accommodate the first secondary battery module;
      a first fixing part configured to fix the first secondary battery module to the first accommodating part;
      a second accommodating part configured to accommodate the second secondary battery module; and
      a second fixing part configured to fix the second secondary battery module to the second accommodating part.

11. The humanoid robot of claim 10, wherein, the first accommodating part and the second accommodating part are disposed so as to open outwardly from the body so that accommodation and removal of the first secondary battery module and the second secondary battery module from outside the body are possible.

12. A humanoid robot comprising:
   a body having one or more projecting parts projecting in a sideward direction of the humanoid robot;
   a first secondary battery module disposed at at least one of a front part or a back part of the body of a humanoid robot;
   a second secondary battery module disposed around the body in a direction intersecting with a front-and-rear direction of the body; and
   a base coupling the first secondary battery module to the second secondary battery module, wherein the base is detachably attached to the body, together with the first secondary battery module and the second secondary battery module; and the second secondary battery module is fitted in hollow portions of the body adjacent to and disposed around the one or more projecting parts such that the second secondary battery module does not project from the hollow portions of the body and thereby does not interfere with operation of the humanoid robot, wherein the second secondary battery module is disposed at a side part of the body, and the base includes:

a first accommodating part configured to accommodate the first secondary battery module;

a first fixing part configured to fix the first secondary battery module to the first accommodating part;

a second accommodating part configured to accommodate the second secondary battery module; and a second fixing part configured to fix the second secondary battery module to the second accommodating part.

13. The humanoid robot of claim 12, wherein, the first accommodating part and the second accommodating part are disposed so as to open outwardly from the body so that accommodation and removal of the first secondary battery module and the second secondary battery module from outside the body are possible.

14. The humanoid robot of claim 4, wherein the base includes:

a first accommodating part configured to accommodate the first secondary battery module;

a first fixing part configured to fix the first secondary battery module to the first accommodating part;

a second accommodating part configured to accommodate the second secondary battery module; and a second fixing part configured to fix the second secondary battery module to the second accommodating part.

15. The humanoid robot of claim 14, wherein, the first accommodating part and the second accommodating part are disposed so as to open outwardly from the body so that accommodation and removal of the first secondary battery module and the second secondary battery module from outside the body are possible.

16. The humanoid robot of claim 8, wherein the base includes:

a first accommodating part configured to accommodate the first secondary battery module;

a first fixing part configured to fix the first secondary battery module to the first accommodating part;

a second accommodating part configured to accommodate the second secondary battery module; and a second fixing part configured to fix the second secondary battery module to the second accommodating part.

17. The humanoid robot of claim 16, wherein, the first accommodating part and the second accommodating part are disposed so as to open outwardly from the body so that accommodation and removal of the first secondary battery module and the second secondary battery module from outside the body are possible.

18. The humanoid robot of claim 9, wherein the base includes:
   a first accommodating part configured to accommodate the first secondary battery module;
   a first fixing part configured to fix the first secondary battery module to the first accommodating part;
   a second accommodating part configured to accommodate the second secondary battery module; and
   a second fixing part configured to fix the second secondary battery module to the second accommodating part.

19. The humanoid robot of claim 18, wherein, the first accommodating part and the second accommodating part are disposed so as to open outwardly from the body so that accommodation and removal of the first secondary battery module and the second secondary battery module from outside the body are possible.